June 14, 1960 — A. M. MOEN — 2,940,464
ANTI-SYPHONING FITTING
Filed March 4, 1957
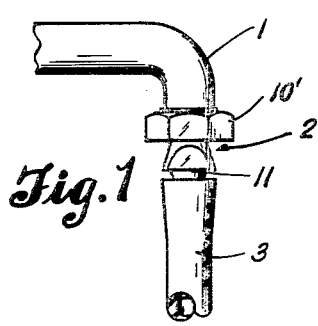
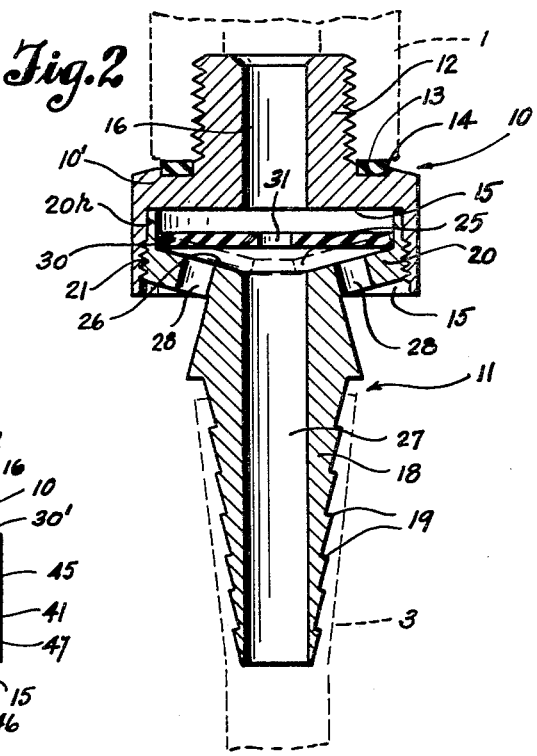
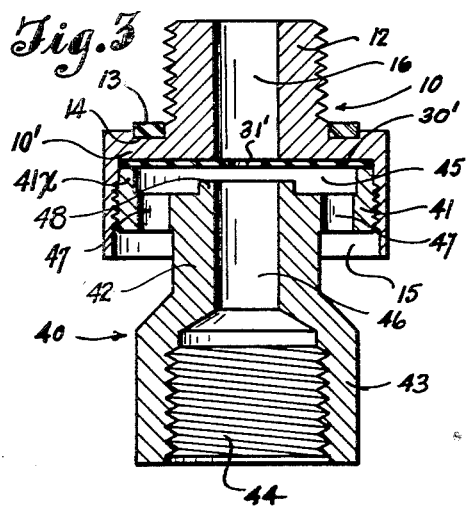
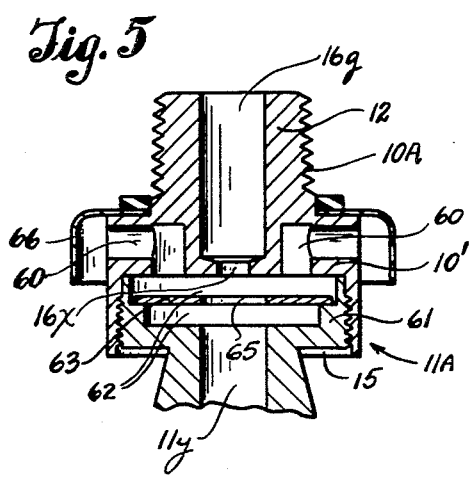
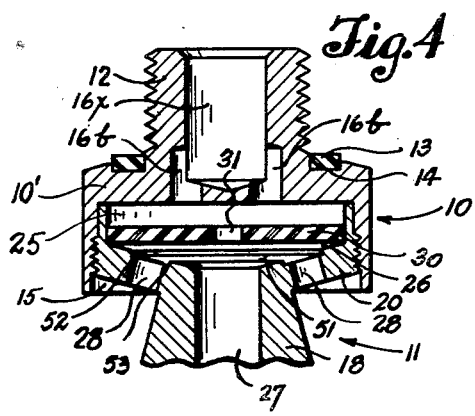
INVENTOR.
ALFRED M. MOEN
BY Robinson + Berry
ATTORNEYS United States Patent Office 2,940,464
Patented June 14, 1960

2,940,464

ANTI-SYPHONING FITTING

Alfred M. Moen, 377 Woodland, Elyria, Ohio

Filed Mar. 4, 1957, Ser. No. 643,784

1 Claim. (Cl. 137—218)

This invention relates to what are generally designated in trade as "syphon breakers" or "vacuum release valves." More particularly it pertains to devices of that character designed to be used in connection with water faucets as a means of preventing any possibility of the return flow of liquid into a water supply system as might take place, for example, through a hose connection with an open faucet when the discharge end of the hose is left immersed in liquid and the pressure in the supply line is, for any reason, discontinued and suction or a syphoning action is set up.

The present device has various uses in connection with valves or faucets having their discharge or outlet sides immersed in liquid or connected to a body of liquid by hose or pipe lines in any way that could result in the sucking or syphoning of said liquid into the water line to which the valve or faucet was attached.

It is a primary object of this invention to provide a suction or syphon breaking valve that may be easily and readily applied to the ordinary types of faucets as used in homes, laboratories, hospitals, restaurants, etc.; that is exceedingly simple in its construction; that embodies few and relatively inexpensive parts and which is effective and efficient for its intended use.

It is a further object of the invention to provide a device of the above mentioned character having one or more ports for admittance of syphon breaking air that are automatically closed by ports acting under the pressure of flowing medium in the service or supply line, and which will be opened automatically if and when the line pressure is discontinued.

Further objects and advantages of the invention reside in the details of construction and combination of parts, the preferred forms of which are illustrated in the accompanying drawings, wherein:

Fig. 1 is a view showing a syphon breaker of the present invention applied to the discharge spout of a faucet attached to a water line.

Fig. 2 is an enlarged, longitudinal, central section of the syphon breaker shown in Fig. 1.

Fig. 3 is a longitudinal section of a syphon breaker of an alternative form of construction embodied by this invention.

Fig. 4 is a central cross-section of another alternative or modified, form of construction embodied by the present invention.

Fig. 5 is a central cross-section view of still another alternative or modified form of construction embodied by the invention.

First, and for better understanding of the use and mode of operation of devices of the present invention, it will be noted that in laboratories, hospitals, and various other places, it is customary to attach a hose to a supply line faucet and let water run therethrough into a receptacle. If, while the water is so running, the pressure in the supply line is temporarily cut off, suction might be created in the line, and by reason of this suction, liquid could be sucked from the receptacle through the hose connection and into the supply line. In the event that the returned liquid was contaminated, this could result in the whole system becoming contaminated with serious or undesirable results. It has been to prevent such back flow and possible supply contamination that the present invention has been devised.

Referring more in detail to the drawings:

In Fig. 1, 1 designates what may be the discharge spout of a faucet that is connected to a water supply line, for example, a city service water supply line; 2 designated in its entirety a syphon breaker embodied by the present invention and 3 designates what may be a hose or pipe connection leading from the syphon breaker outlet to a point of use of the liquid supplied through the faucet. The syphon breaker 2 might be in any one of the various forms shown in Figs. 2, 3, 4 or 5 since each is used in the same manner and for the same purpose as the others.

Referring first to the device of Fig. 2; 10 designates in its entirety what will be referred to as the inlet portion of the device, and 11 designates in its entirety what is designated as the outlet portion. The inlet portion has an externally threaded nipple 12, of reduced diameter, projecting upwardly and concentrically from the body portion 10' and this is adapted to be threaded into the outlet of the faucet spout 1 in a water tight connection. To insure such a connection, a gasket 13, preferably of rubber, or the like, is set in an annular groove or channel 14 formed in the top surface of the body closely about the nipple, and this is tightened against the end of the faucet spout in the threading of the parts together, as shown in Fig. 2.

Leading upwardly into the body 10' of the inlet portion from its lower end and coaxially thereof, is an internally-threaded socket 15, and formed coaxially through the nipple 12 and opening into the socket, is the inlet channel 16 through which liquid from the faucet normally flows upon opening the faucet control valve.

The outlet portion 11 of the device comprises an axially bored stem or nipple portion 18 over which an end of the hose 3 is applied in a non-leaking connection. Preferably, this stem or nipple is formed externally with encircling ribs 19, as shown, designed to prevent accidental disconnection of the hose therefrom. At the upper end of the stem is a diametrically enlarged head portion 20 that is threaded, as at 21, into the downwardly opening socket 15 of the inlet portion of the device. The peripheral, or rim portion 20r of the head 20 seats in an air and water tight joint against the bottom of the socket 15.

Formed in the head portion 20 of the outlet member 11 is a circular depression or chamber 25, which is defined by the rim portion 20r of the body. This chamber has an inwardly and downwardly sloping conical bottom surface 26. Formed coaxially through the stem is an outlet channel 27; this being axially aligned with and of the same diameter as the inlet channel 16 in the member 10. Between the entrance to the channel 27 its outer periphery, the head portion 20 has a plurality of air ports 28 bored through the bottom wall of the chamber, opening from outside to the interior of chamber 25. Disposed horizontally within the chamber 25 for free vertical movement therein is a flat flexible valve disk 30 of rubber, or other suitable material, the peripheral edge of which disk normally rests, as noted in Fig. 2, upon the outer periphery of the conically sloping bottom surface 26. When this disk is not forcibly depressed, it uncovers the ports 28, as seen in Fig. 2.

Formed centrally of the flexible disk is a hole 31 of about half the diameter of the channels 16 and 27, and it is through this that water entering through channel 16 is discharged.

Assuming that the device has been applied to a faucet in the manner shown in Fig. 1, it will be understood that when water under pressure is turned on, it passes through the faucet spout, and into the device 2 and builds up pressure against the top of the disk 30 and forces it downwardly and flatly against the bottom surface 26 of the chamber 25; such build up of pressure is due to the fact that the port 31 through the disk is substantially smaller than the inlet 16. In its depressed position, as seen in dash lines in Fig. 2, the valve disk covers the several ports 28 and seals them against outflow of water therethrough or intaking of air. When water pressure is cut off as by closing the faucet valve, the resilient disk 30 returns to its normal position as shown in full lines in Fig. 2, and again uncovers the ports 28.

If, while water is being discharged through the hose 3 into a receptacle, with the discharge end of the hose immersed in the water, should the pressure in the supply line for any reason be completely lost, the depressed disk 30 will immediately flex upwardly from its depressed position, thus uncovering the port 28, and admitting air to the chamber 25 and through the thin disk port 31, to the water system to break any liquid syphoning action or suction that might otherwise result; the action of the disk 30 in this respect being entirely automatic.

The devices shown in Figs. 3, 4 and 5 are the same in purpose and mode of use to that of Fig. 2 and parts that are alike, or correspond, have in all views been given the same reference numerals. In the device of Fig. 3, the inlet portion 10 comprises a nipple 12, a body portion 10' formed with a downwardly opening socket 15 into which the inlet channel 16 opens. The outlet member which is somewhat different in design from that of Fig. 2, is designated in its entirety by numeral 40 and it is shown to comprise a head portion 41 that is threaded into the socket 15 of the inlet member; a stem portion 42 of reduced diameter leading downwardly and centrally from the head portion and formed at its lower end with an enlargement 43 which is bored and internally threaded to provide a socket 44 adapted to receive a hose connecting fitting or the like. The head portion 41 is formed in its top side with a shallow depression or socket 45 defined by the encircling rim or peripheral portion 41x of the head. A channel or bore 46 is formed coaxially of the outlet and this opens at its opposite ends into the sockets 44 and 45. Also, there are air ports 47 opening through the bottom wall of the socket 45 to outside, providing for an inflow of air to the socket when the ports are uncovered.

Disposed against the top or base wall of the socket 15 of the head 10' of the inlet portion is a flexible disk 30', of rubber or other suitable material, formed with a central port 31' of substantially lesser diameter than the inlet passage 16. This disk is clamped in an air and water tight joint between the top surface of the rim 41x of the head of the outlet member and the base wall of socket 15.

The device of Fig. 3 is used and functions in the same manner as the device of Fig. 2. When the water is turned on, under pressure through the faucet into the passage 16 of the inlet member, it flexes the disk 30' downwardly and causes it to engage tightly against an upstanding flange 48 formed on the bottom of socket 25 about the entrance to the outlet passage 46 thus to seal off any outflow of water through the ports 47. However, when water pressure in the supply line is discontinued, the disk moves back to its position free of the flange 48 and provides for inflow of air to the passage 16 as a means of breaking any syphoning condition existing in the connection.

The device of Fig. 4 comprises an inlet portion 10 which is substantially identical to that of Figs. 2 and 3 except that it is formed with an inlet bore 16x that terminates short of the socket 15 as formed in the head portion 10', and from it several branch ports or passages 16b lead into the socket 15 at points which are spaced substantially from its axial center. The outlet member 11, and the contained disk 30, are substantially like those parts as seen in Fig. 2. The conical surface 26 of the head portion 20 has an annular groove 51 formed therein intermediate the body of the head portion 20. The groove 51 surrounds the outlet channel 27. The groove 51 has concentric annular shoulders 52 and 53 made by cutting the groove in the head portion 20. The groove 51 and its shoulders 52 and 53 provide an annular air space below the valve disk 30 when flow is had through the anti-syphon connector so that the valve disk 30 will have atmospheric pressure against a large portion of the underside thereof to aid in breaking away from the head portion upon stoppage of flow through the connector or upon suction in the supply line. Also when boring the air ports 28 in the head portion 20 burrs may be left on the ends thereof. The groove 51 will also prevent the valve disk 30 from contacting these burrs thereby alleviating any damage to the valve disk. When liquid under pressure is delivered into the chamber 25, it flexes the disk downwardly, tightly against the bottom surface of the chamber covering the groove 51 and thereby seals off the ports 28, but when this water pressure in the supply line is removed or discontinued, the disk returns to normal position and allows air to enter to break any syphoning action. As suction increases, disc 30 raises and closes passages 16b.

The device of Fig. 5 comprises an inlet member 10A and an outlet member 11A. The inlet member comprises a head portion 10' formed with a downwardly opening socket 15, and an upwardly extending, exteriorly threaded nipple 12 for threaded connection with the faucet spout. An inlet bore 16g leads through the nipple and opens into the base of socket 15 through a restricted or tapered passage, as at 16x, which has a nozzle like effect. Air ports 60 lead inwardly through the sidewalls of the head portion and then downwardly into the socket 15 through its base wall.

The outlet member 11A has a head portion 61 threaded into the socket 15, and this head portion is formed with an upwardly facing socket 62 of stepped diameters. An outlet passage 11y leads from the base of socket 62, in coaxial alignment with the inlet passage 16g. A flat valve disk 63 is disposed for free up and down movement in the socket 62, being supported on the outer shoulder of the stepped socket. This disk has a central opening 65 which is substantially greater in diameter than the passages 16x. Water discharged from inlet passage 16x under pressure, through disk passage 65 builds up pressure against the underside of the disk 63 and lifts it to cover and seal off the ports 60. If the water supply is discontinued, the disk automatically drops and opens the ports to admit air to break any syphoning action. If there is a slight restriction in the discharge, a back pressure is created. This will cause the disk to rise and to close the air inlet ports. This requires that the disk be freely movable in the chamber and by experiments it has been found that the desired results are obtainable by this construction. In this device, an apron 66 with cylindrical wall is applied to the head portion of the inlet member, and outwardly spaced therefrom, to depend below the inlet ports as shown.

Each of these several devices is characterized by having a valve member that operates automatically to admit air to the supply line to break any syphoning action, and which also acts automatically under pressure of water flowing through the connection to close the air ports against outflow of water therethrough.

The device in each of its illustrated forms, is simple in construction, easy to apply, relatively inexpensive, and effective and efficient in use.

What I claim as new is:

An anti-syphoning connector adapted to be interposed between a line supplying fluid under pressure and a discharge line, said connector comprising an upper portion having axially offset inlet ports therein and a lower portion having a central discharge port and an annular groove concentric with the discharge port and having annular concentric shoulders on each side thereof, the groove having axially offset air ports therein for admitting air to the pressure chamber, a flexible valve disk loosely mounted in the pressure chamber and freely movable between the upper portion and the lower portion, the valve disk being bodily movable within the pressure chamber at least a distance substantially equal to the thickness thereof, the valve disk having an axially centered passage therethrough aligning with the discharge port, the area of the passage through the valve disk being less than the combined area of the inlet ports, whereby the pressure of the incoming fluid into the pressure chamber will be applied against the upper side of the valve disk to bodily move the disk downwardly and bridge over the annular shoulders of the groove in the lower portion of the pressure chamber and prevent air from entering the pressure chamber through the air ports while allowing the groove to be filled with air from the air ports thus preventing the valve disk from being held in this position upon the cutting off of flow through the pressure chamber, and upon relief of the pressure of incoming fluid the disk will bodily move upwardly to uncover the annular groove and the air ports to allow air to enter the pressure chamber and drainage of fluid from the chamber, and upon suction in the supply line the disk will move bodily upwardly to directly engage the inlet ports and close the same thus preventing syphoning of any fluid in the chamber and the discharge line into the supply line.

References Cited in the file of this patent
UNITED STATES PATENTS

| | | |
|---|---|---|
| 2,033,467 | Groeniger | Mar. 10, 1936 |
| 2,117,389 | Yoder | May 17, 1938 |
| 2,159,692 | Fox | May 23, 1939 |
| 2,282,338 | Moody | May 12, 1942 |
| 2,646,063 | Hayes | July 21, 1953 |
| 2,770,250 | Smith | Nov. 13, 1956 |